Jan. 15, 1952  HENRI-GEORGES DOLL  2,582,315
DIFFERENTIAL COIL SYSTEM FOR INDUCTION LOGGING
Filed Sept. 3, 1949  2 SHEETS—SHEET 1

INVENTOR.
HENRI-GEORGES DOLL
BY
HIS ATTORNEYS.

Jan. 15, 1952  HENRI-GEORGES DOLL  2,582,315
DIFFERENTIAL COIL SYSTEM FOR INDUCTION LOGGING
Filed Sept. 3, 1949  2 SHEETS—SHEET 2

LATERAL DISTANCE FROM LONGITUDINAL
AXIS OF COIL SYSTEM

INVENTOR.
HENRI-GEORGES DOLL
BY
Campbell, Brumbaugh, Free & Graves
HIS ATTORNEYS.

Patented Jan. 15, 1952

2,582,315

UNITED STATES PATENT OFFICE 2,582,315

DIFFERENTIAL COIL SYSTEM FOR INDUCTION LOGGING

Henri-Georges Doll, Ridgefield, Conn., assignor to Schlumberger Well Surveying Corporation, Houston, Tex., a corporation of Delaware Application September 3, 1949, Serial No. 113,971

6 Claims. (Cl. 175—182)

The present invention relates to well logging systems and more specifically to a novel well logging method and apparatus which responds to variations in the electrical conductivity of the surrounding earth formations, as a function of the lateral distance from the bore hole axis.

The co-pending application Serial No. 99,300, filed June 15, 1949, by the same applicant, for "Electromagnetic Well Logging Systems," discloses a plurality of different induction logging systems having sensitivity characteristics designed to meet different operational needs. In particular, that application describes induction logging systems having reduced lateral sensitivity in zones both near and relatively far away from the bore hole axis, as well as systems having reduced longitudinal sensitivity to materials lying above and below the coil system.

The present application is addressed to related induction logging systems which are characterized by substantially zero response in a homogeneous medium and a response in an inhomogeneous medium which is a function of the electrical conductivity of the surrounding formations at different lateral distances from the axis of the well. It will be understood, therefore, that induction logging systems of the present invention are of special utility for investigating the extent of invasion of the formations by the fluid which is usually present in a bore hole.

It is an object of the invention, accordingly, to provide a novel well logging method and apparatus by means of which information as to the relative homogeneity of the surrounding formations may be secured.

Another object of the invention is to provide a novel method and apparatus of the above character for investigating the extent of invasion of subterranean formations by fluid contained in a well traversing the formations.

Still another object of the invention is to provide a novel well logging method and apparatus, the response from which is a function of the inhomogeneity of the surrounding material in a direction extending transversely of the longitudinal axis of the apparatus.

A well logging system having the desired properties may be formed, according to the invention, by combining at least two two-coil systems, each having different lateral sensitivity characteristics, in such fashion as to produce a resultant lateral sensitivity characteristic which is zero at a given lateral distance from the longitudinal axis of the apparatus and has positive and negative loops, the areas beneath which are substantially equal.

When the surrounding medium is homogeneous, therefore, the responses from those regions of the medium corresponding to the positive and negative loops, respectively, of the lateral sensitivity characteristic are equal and opposite, so that the total response of the device is zero. In an inhomogeneous medium, on the contrary, the responses from those regions corresponding to the respective positive and negative loops of the lateral sensitivity curve are not equal. Hence, the total response in such case will no longer be zero but will have a value depending upon the nature of the inhomogeneity.

Additional objects and advantages of the invention will become apparent from the following detailed description of several representative embodiments, taken in conjunction with the accompanying drawings in which.

Figure 1:
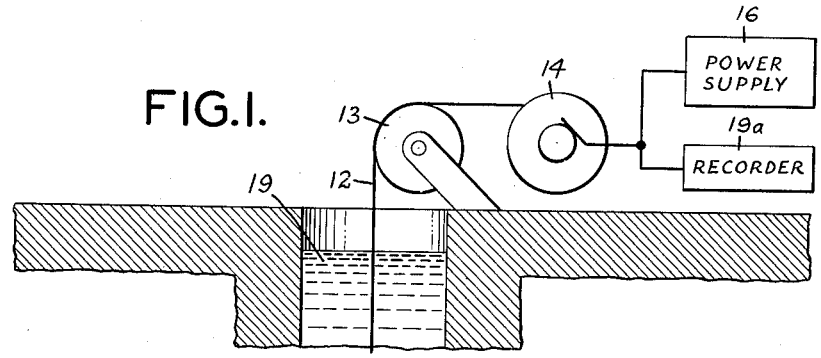
Fig. 1 is a schematic diagram of induction logging apparatus constructed according to the invention.

In the typical form of the invention shown in Fig. 1 the induction logging apparatus 10 is suspended in a bore hole 11 on a cable 12 extending to the surface of the earth. The bore hole 11 may contain a liquid 19 which may be more or less conductive than the surrounding earth. The cable 12 passes over a pulley 13 to a suitable winch 14 by means of which it may be raised and lowered in the bore hole 11.

The logging apparatus 10 may comprise, for example, two two-coil systems, i. e., one comprising a main transmitter coil 15 and a main receiver coil 17, and the other including an auxiliary transmitter coil 20 and the common receiver coil 17, all three coils being longitudinally disposed along a common axis. The main coil system was defined in the above-mentioned co-pending application Serial No. 99,300 as that pair of transmitter-receiver coils which would produce the maximum response when used alone in a homogeneous medium. Actually, for a differential logging device comprising only two two-coil systems, as in the present case, either transmitter-receiver coil combination may be taken as the main coil system. For this three-coil embodiment, however, the transmitter coil having the larger number of turns will be designated the main coil.

The main transmitter coil 15 and the auxiliary transmitter coil 20 are connected in series opposition, as shown, and are supplied with alternating current from a suitable oscillator in a cartridge 18 which may be energized by a power supply 16 through conductors (not shown) in the cable 12. The receiver coil 17 is connected to suitable electronic equipment in the cartridge 18. The electronic circuits in the cartridge 18 may be of the type disclosed in copending application Serial No. 750,307 for "Phase Rejection Networks," filed May 24, 1947, by the same applicant, and they are preferably designed to select the rectified resistive component of the signals induced in the receiver coil 17.

The resistive signal component output of the cartridge 18 is transmitted through conductors (not shown) in the cable 12 to conventional recording means 19a which preferably records automatically the resistive component or a function thereof of the combined voltages induced in the receiver coil 17 as the apparatus 10 is moved through the bore hole 11.

In order to secure the desired differential sensitivity characteristic for an induction logging system, it has been found that the following conditions must be met:

(a) the logging system must comprise at least two transmitter-receiver coil systems in combination;

(b) the lateral sensitivity curves for the two transmitter-receiver coil systems, drawn to the same scale, must not be the same, i. e., their peaks must not occur at the same lateral distance from the axis of the logging system; and (c) the following relation should be substantially satisfied:

$$\sum_{t,r} \frac{(\pm S_t)(\pm S_r)}{D_{t,r}} = 0 \quad (1)$$

In the summation, $t$ and $r$ range over all possible pairs of transmitter and receiver coils, $D_{t,r}$ is one-half the separation distance between a pair of coils being considered, $S_t$ is the total area of a transmitter coil (the mean area bounded by one turn multiplied by the number of turns) and $S_r$ is the total area of a receiver coil. Thus, the numerator is the product of the total areas of a pair of coils and the denominator is one-half their separation distance.

The signs in the numerator indicate the polarity of the windings of each coil. If a particular coil in, say, the transmitter system is taken to be positive, then all other transmitter coils which are connected in series aiding with that coil are also considered positive, while those transmitter coils which are connected in series opposition with that coil are taken to be negative. A similar convention may be established for coils in the receiver system if more than one receiver coil is employed.

When the coils are solenoids of equal radii disposed along a common axis, relation (1) may be simplified to:

$$\sum_{t,r} \frac{(\pm N_t)(\pm N_r)}{D_{t,r}} = 0 \quad (2)$$

where $N_t$ and $N_r$ are the numbers of turns in the transmitter and receiver coils, respectively, comprising a pair being considered. Relation (2) is most convenient for use in designing coil systems according to the invention since, in practice, the coils would usually be short solenoids of equal radii longitudinally spaced apart on a non-inductive and non-conductive mandrel secured to the cartridge 18.

It can be readily demonstrated that the system shown in Fig. 1 with coaxial coils of equal radii will meet the three conditions (a), (b) and (c) stated above if, for example, the auxiliary transmitter coil 20 is located halfway between the coils 15 and 17 and has one-half the number of turns of the main transmitter coil 15. Since the peak of the sensitivity curve for a two-coil transmitter-receiver system occurs at about 0.9 the half separation distance between the two coils, the peaks for the two-coil systems in Fig. 1 will then lie at about 0.45D and 0.9D, respectively, where D is the half separation distance between the main coils 15 and 17.

Figure 2:
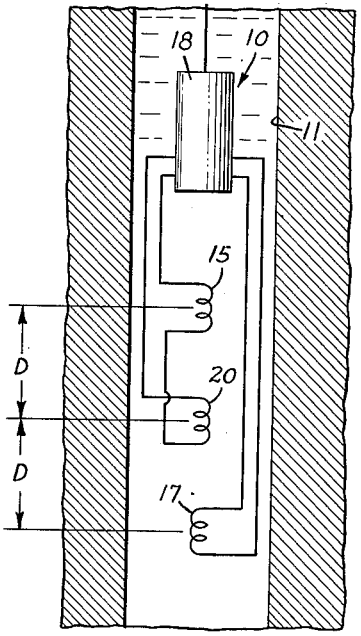
Fig. 2 is a graph illustrating a typical lateral sensitivity curve for the apparatus shown in Fig. 1.
Figure 2:
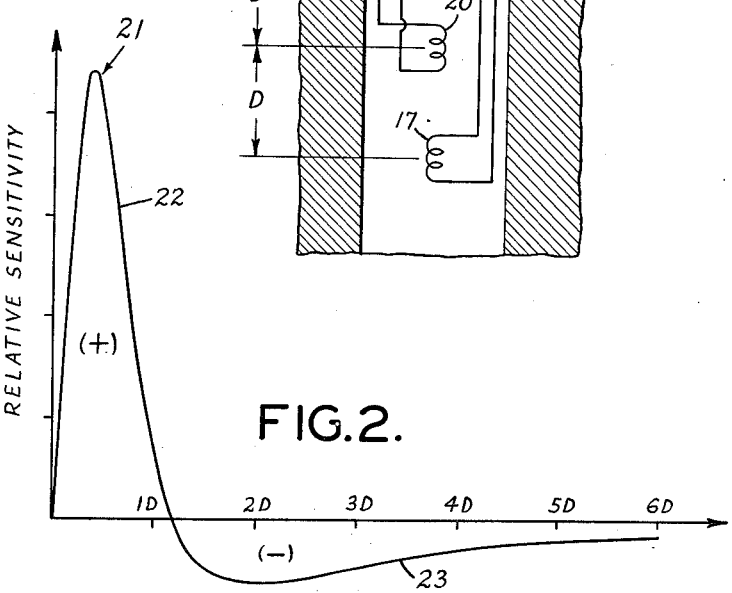

A typical lateral sensitivity curve for the coil system of Fig. 1 designed so as to satisfy the three conditions (a), (b) and (c) specified above is shown in Fig. 2. The lateral sensitivity of an induction logging system at any lateral distance from its longitudinal axis is defined as the resistive component of the response of the system to a concentrically situated long cylindrical shell of unit thickness and unit conductivity, whose radius is equal to the said lateral distance. The relative responses obtained for cylindrical shells of different radii in a homogeneous medium, all other factors being kept constant, determine the sensitivity of the system at different lateral distances from its longitudinal axis. The total response of the system, therefore, is proportional to the total area under the sensitivity curve.

Of course, if the medium is not homogeneous but is composed of adjacent cylindrical shells of different conductivities, for example, the contribution made by each shell to the total response of the system will be proportional to the conductivity of the shell and to its thickness as well as to the sensitivity of the system at the shell radius.

Referring to Fig. 2, the abscissae for the lateral sensitivity curve are lateral distances from the longitudinal axis of the coil system corresponding to the different radii assumed for the cylindrical shell, measured in terms of the half separation distance D between the coils 15 and 17, while the ordinates are the relative sensitivity values of the combination for the respective shell radii. It will be seen that the sensitivity curve 21 has a positive loop 22 of relatively large amplitude, is zero at about five-fourths D and has a negative loop 23 of smaller amplitude.

Since the relation (1) above is satisfied, the area below the positive loop 22 is substantially equal to the area above the negative loop 23. Accordingly, if the induction logging system is located in a homogeneous medium, its response will be zero. On the other hand, if the system is located in a medium which is inhomogeneous in a direction extending laterally of the device, the response of the latter will no longer be zero but will have a value depending upon the nature of the inhomogeneity. The system, therefore, is of special utility for investigating the problem of invasion of earth formations by the fluid which is usually present in a bore hole.

While the system shown in Fig. 1 is effective, it produces a log which is not symmetrical. In other words, the portions of the log obtained in the vicinity of the upper and lower boundaries of a homogeneous formation sandwiched between two other identical homogeneous formations of different properties, are not symmetrical about a horizontal median line through the formation. If symmetrical logs are desired, a logging system of the type shown in Fig. 3 may be employed.

Figure 3:
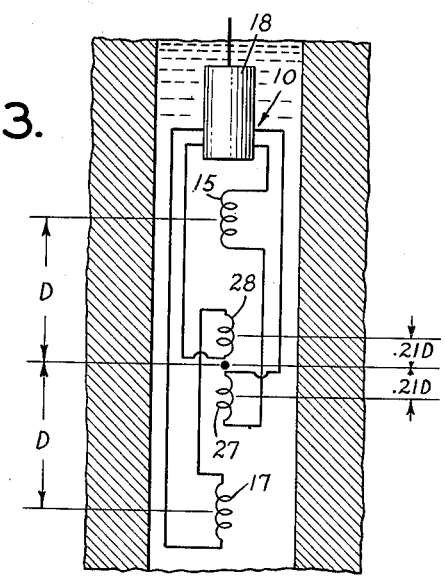
Fig. 3 illustrates schematically another form of the invention designed to provide symmetrical logs, together with reduced lateral sensitivity near the axis of the coil system.

Considering now Fig. 3, the logging system comprises main transmitter and receiver coils 15 and 17 respectively, and auxiliary transmitter and receiver coils 27 and 28, respectively, forming four two-coil systems, namely, the coils 15 and 17, the coils 15 and 28, the coils 17 and 27 and the coils 28 and 27. Preferably, the main transmitter coil 15 and the main receiver coil 17 are connected, respectively, in series opposition with the auxiliary coils 27 and 28.

Preferably, the turn ratios between the coils 27 and 15 and between the coils 28 and 17 should be the same, although the number of turns in a main or auxiliary coil need not be the same as in the other main or auxiliary coil. Further, both the main coils and the auxiliary coils should be symmetrically disposed about the midpoint of the coil system. Under these conditions, the lateral sensitivity of the two-coil system comprising the coils 15 and 28 will be the same as the lateral sensitivity of the two-coil system including the coils 17 and 27. The lateral sensitivity curve for the over-all system will be the composite of the several lateral sensitivity curves for the combined four two-coil systems. Furthermore, the log of the combined response of the coil systems will be symmetrical, as defined above, in the longitudinal direction.

With a separation distance between the auxiliary coils 27 and 28 that is 0.21 of the separation distance between the main coils 15 and 17, it can be shown that the three conditions (a), (b) and (c) specified above will be satisfied if each auxiliary coil is connected in series opposition with, and has substantially 26.2% of the area of, the corresponding main coil.

Figure 4:
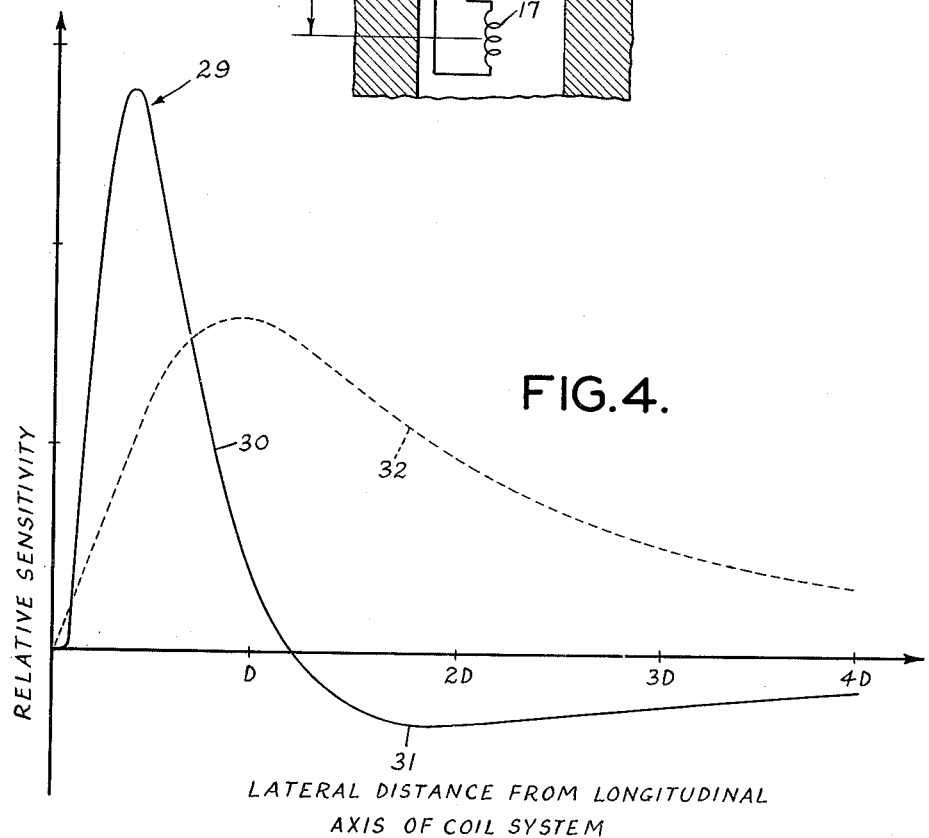
Fig. 4 is a graph showing a representative lateral sensitivity curve for the device illustrated in Fig. 3.

A typical lateral sensitivity curve for a coil system of the type shown in Fig. 3 is given in Fig. 4. As shown in this figure, the sensitivity curve 29 has a negative loop 30 of relatively large amplitude, is zero at about five-fourths D and has a positive loop 31 of relatively smaller amplitude, the areas between the loops 30 and 31 and the abscissae axis being substantially equal. A typical lateral sensitivity curve 32 for a conventional two-coil logging system comprising only the coils 15 and 17 is also shown in Fig. 4 for purposes of comparison.

Since the auxiliary coils 27 and 28 act in opposition to the main coils 15 and 17, the mutual inductance of the system can be substantially reduced. This is desirable since it decreases the inductive component of the E. M. F. in the receiver groups of coils. In the system of Fig. 3, for example, the mutual inductance is substantially nil for the spacings and turn ratios used.

In Fig. 4, the lateral distance from the longitudinal axis of the coil system over which the sensitivity is negligible is only a fraction of the half-separation distance D of the main coils. By devising multi-coil systems as outlined in the applicant's co-pending application Serial No. 99,300, differential coil systems to accomplish the objects of this invention can be constructed which also are characterized by negligible lateral sensitivity over a radial extent beyond the radius of the largest caving present in the bore hole. In that case the differential coil system will give a substantially null response opposite a thick homogeneous formation regardless of the relative conductivities of the drilling fluid and the formation, which condition will also be substantially independent of changes in bore hole diameter.

If the system is not designed for reduced sensitivity in the region occupied by the conductive drilling fluid, the differential induction logging system, centralized on the axis of the bore hole, will give a constant reading opposite a relatively thick homogeneous formation if the bore hole remains to gauge. If, however, the bore hole fluid has substantially the same conductivity as the homogeneous formation, the reading will be substantially nil.

From the foregoing, it will be understood that the invention provides a novel and highly effective induction logging system which is sensitive to inhomogeneity of the formations in a direction extending transversely of the longitudinal axis of the apparatus. By virtue of this desirable property, it is of special utility in applications such as the investigation of the invasion of earth formations by a column of liquid contained in a bore hole.

The effect of different conductivities over regions of different lateral extent can be evaluated for a given coil system by using the methods outlined in a paper by the applicant entitled "Introduction to Induction Logging and Application to Logging of Wells Drilled with Oil Base Mud," printed as T. P. 2641 in the June issue of Journal of Petroleum Technology (AIME), vol. 1, page 148, 1949.

It will be understood that the principle of reciprocity applies to coil systems constructed according to the invention. Hence, the same results will be obtained if, in the embodiments described above, the coil or coils designated as a receiver coils are connected to the source of electrical energy and the transmitter coils are connected to serve as receiver coils. In Fig. 1, for example, the coil 17 could be connected to the source of alternating current in the cartridge 18 and the coils 15 and 20 to the recorder 19a without changing the results obtained.

It will be further understood that the several specific embodiments described herein by way of illustration can be considerably modified within the spirit of the invention. For example, the desired sensitivity characteristic can be secured with other coil configurations than those shown. Four-coil systems characterized by zero mutual inductance and having unsymmetrical vertical sensitivity patterns can be constructed which will have the desired response. However, symmetrical coil systems of the type shown in Fig. 3 are preferred. Other variations will be readily apparent to those skilled in the art. The several forms of the invention disclosed herein, therefore, are not to be regarded as limiting the scope of the following claims.

I claim:

1. In induction well logging apparatus, the combination of at least two transmitter-receiver two-coil systems adapted to be lowered into a bore hole, a source of electrical energy connected to said two-coil systems to energize the same, and electrical indicating means connected to receive the opposed responses of said two-coil systems, the spacings for the coils in said two-coil systems being different so as to produce peak sensitivities for said two-coil systems at different lateral distances from the apparatus, said two-coil systems being designed to have lateral sensitivity characteristics such that the lateral sensitivity characteristic for the over-all system gives a zero response in a homogeneous medium and a response in an inhomogeneous medium which is a function of the inhomogeneity of the medium in a direction extending laterally of the longitudinal axis of the apparatus.

2. In induction well logging apparatus, the combination of at least three coils adapted to be lowered into a bore hole in fixed, longitudinally spaced apart relation with respect to one another, a first circuit connecting two coils of said three in opposite relation to one another, a second circuit including said third coil, a source of alternating current connected to one of said circuits, and electrical indicating means connected to the other of said circuits, the spacings and total areas of said coils being selected so as substantially to satisfy the relation $$\sum_{1,2} \frac{(\pm S_1)(\pm S_2)}{(D_{1,2})} = 0$$

where the summation is taken over all possible pairs of coils, each pair comprising a coil in said first circuit and a coil in said second circuit, $D_{1,2}$ is one-half the separation distance between a pair of coils being considered, $S_1$ is the total area of the first circuit coil of said pair, and $S_2$ is the total area of the second circuit coil of said pair, plus or minus signs being assigned to the areas $S_1$ and $S_2$ depending upon the relative polarities of the corresponding coils, and the distances between said third coil and each of said two coils being unequal.

3. In induction well logging apparatus, the combination of at least four coils adapted to be lowered into a bore hole in fixed, longitudinally spaced apart relation with respect to one another, a first circuit connecting at least two of said coils in opposed relation to one another, a second circuit connecting two other of said coils in opposed relation to one another, a source of electrical energy connected to one of said circuits, and electrical indicating means connected to the other of said circuits, said four coils forming a plurality of two-coil systems, each comprising a coil in said first circuit and a coil in said second circuit, the separation distances for the coils in at least two of said two-coil systems being different, and said coils being designed so as substantially to satisfy the relation $$\sum_{1,2} \frac{(\pm S_1)(\pm S_2)}{D_{1,2}} = 0$$

where the summation is taken over all possible pairs of coils, each pair comprising a coil in said first circuit and a coil in said second circuit, $S_1$ and $S_2$ are the total areas, respectively, of the first circuit coil and second circuit coil comprising a pair, plus or minus signs being assigned to the total areas $S_1$ and $S_2$ depending upon the polarities of the corresponding coils, and $D_{1,2}$ is one-half the separation distance between said pair of coils.

4. In induction logging apparatus, the combination of a pair of coaxially disposed main coils of equal radii adapted to be lowered into a bore hole, said coils being longitudinally spaced apart equal distances on opposite sides of a reference point, a pair of auxiliary coils of said same equal radii movable coaxially with said main coils and longitudinally spaced apart equal different distances on opposite sides of said reference point, a first circuit connecting one of said main coils in series opposition with the auxiliary coil farthest away therefrom, a second circuit connecting the other of said main coils in series opposition with the other of said auxiliary coils, a source of electrical energy connected to one of said circuits, and electrical indicating means connected to the other of said circuits, said coils being designed so as substantially to satisfy the relation $$\sum_{1,2} \frac{(\pm N_1)(\pm N_2)}{D_{1,2}} = 0$$

where the summation is taken over all possible pairs of coils, each pair comprising a coil in said first circuit and a coil in said second circuit, $N_1$ and $N_2$ are the total turns, respectively, of the first circuit coil and second circuit coil comprising a pair, plus or minus signs being assigned to the turns $N_1$ and $N_2$ depending upon the polarities of the corresponding coils, and $D_{1,2}$ is one-half the separation distance between said pair of coils.

5. In induction logging apparatus, the combination of three solenoids of equal radii disposed along a common axis, a first circuit connecting a first and second solenoid of said three solenoids in series opposition, a second circuit comprising the third solenoid, a source of alternating current connected to one of said circuits, electrical indicating means connected to the other of said circuits, the number of turns and spacings between said first circuit solenoids being selected so as substantially to satisfy the relation $$\frac{N_1}{D_{13}} - \frac{N_2}{D_{23}} = 0$$

where $N_1$ and $N_2$ are the numbers of turns on said first and second solenoids and where $D_{13}$ and $D_{23}$ represent one-half the separation distances between said first and second solenoids and said third solenoid, respectively, $D_{13}$ being different in magnitude from $D_{23}$.

6. In apparatus for investigating earth formations traversed by a bore hole, the combination of at least two alternating current energized transmitter-receiver two-coil systems constructed and arranged so as to provide a resultant response which is the difference between the separate responses of said two-coil systems, the spacings for the coils in said two-coil systems being different so as to produce peak sensitivities for said two-coil systems at different lateral distances from the apparatus, and said two-coil systems being designed so as to produce a resultant response that is substantially zero in a homogenous medium, and means for obtaining indications of said resultant response.

HENRI-GEORGES DOLL.

REFERENCES CITED

The following references are of record in the file of this patent:

UNITED STATES PATENTS

| Number | Name | Date |
|---|---|---|
| 2,220,070 | Aiken | Nov. 5, 1940 |
| 2,264,318 | Lee | Dec. 2, 1941 |
| 2,304,051 | Beers | Dec. 1, 1942 |